Nov. 8, 1966   W. E. SELL   3,284,804
OSCILLOGRAPH CONTROL
Filed Jan. 27, 1965
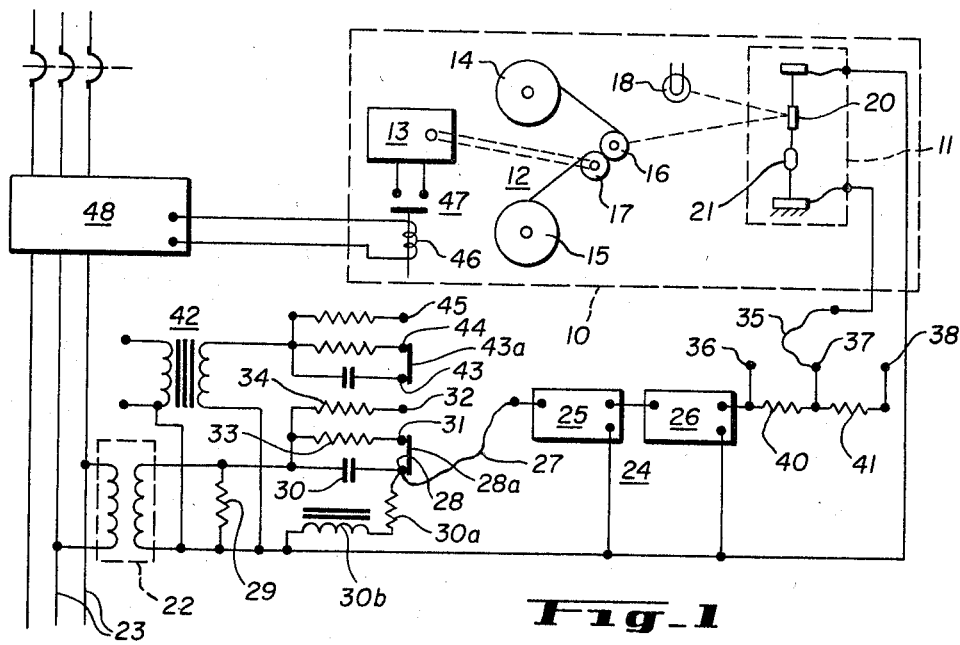
Fig_1
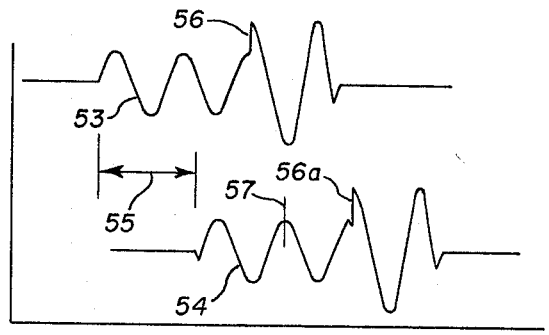
Fig_2
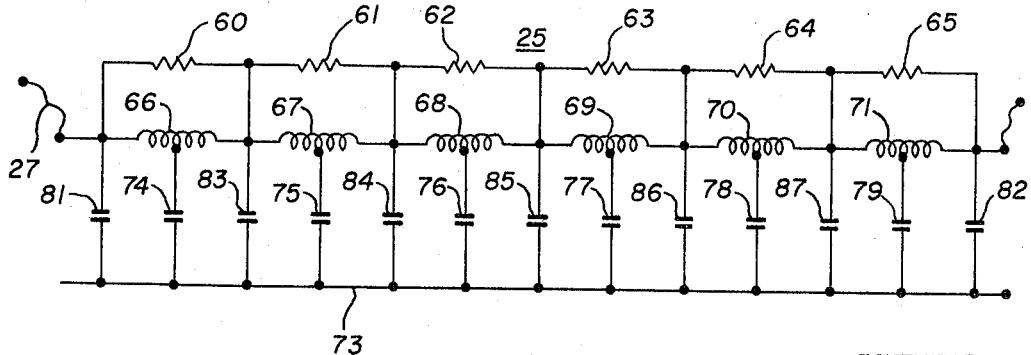
Fig_3
INVENTOR.
Wayne E. Sell
BY
ATTORNEYS

# United States Patent Office 3,284,804
Patented Nov. 8, 1966

3,284,804
OSCILLOGRAPH CONTROL
Wayne E. Sell, Littleton, Colo., assignor to Hathaway Instruments Inc., Denver, Colo., a corporation of Colorado
Filed Jan. 27, 1965, Ser. No. 428,513
2 Claims. (Cl. 346—109)

This invention relates to the control of recording oscillographs and particularly to an improved time delay circuit for controlling such oscillograph to produce records of transient phenomena which occurred prior to the start of the recording operation.

It has been recognized heretofore that a high speed oscillograph may be operated to produce a record of electrical conditions prevailing, for example, immediately before the occurrence of a fault which initiates the recording operation of the oscillograph. This type of operation may be accomplished by energizing the exciting coil of the oscillograph galvanometer continuously through a time delay line so that the vibrations of the galvanometer occur a predetermined interval of time after the electrical conditions to which they correspond. Upon the occurrence of a fault and the starting of the recording operation of the oscillograph the recorded trace will be that of an event occurring before the start of recording. Thus transients or disturbances occurring in a power line may be recorded after opening of a circuit breaker in a manner to indicate the condition of the line immediately before the occurrence of the fault which caused the breaker to open. The delay lines provided heretofore, and which are suitable to provide the required time delays for this purpose, are heavy and cumbersome and have not been entirely suitable to all applications. Accordingly, it is an object of the present invention to provide an improved delay line circuit.

It is another object of this invention to provide an improved time delay line for recording oscillographs of the type providing a record of transient conditions or disturbances on a power line preceding the opening of a circuit breaker or the like.

It is a further object of this invention to provide an improved time delay line of simple construction and which is consistent and reliable in performance and which effects time delay without distortion of the wave form.

It is a still further object of this invention to provide an improved time delay circuit which may readily be constructed in a unit which may be connected in series with like units to provide effectively and accurately predetermined periods of time delay.

Briefly, in carrying out the objects of this invention in one embodiment thereof, a high speed recording oscillograph is connected with a delay line between the signal source and the galvanometer coil so that the coil is vibrated continuously whether or not the oscillograph is recording. Upon the occurrence of a fault and initiation of the recording operation, a record is made beginning at a time preceding the fault condition causing the oscillograph to operate. The delay line comprises a circuit in which a plurality of equal resistances and the same number of equal inductances are connected in pairs each pair comprising one resistance and one inductance. The pairs are connected in series and the end terminals of the pairs are connected to a common ground or base potential line by capacitors, all the capacitors being equal except the two circuit terminating capacitors which are each of one-half the capacitance of the others. The inductances are provided with mid-taps and these are connected to the reference potential line through capacitors having capacitance equal to that of the first mentioned or intermediate capacitors.

The features of novelty which characterize this invention are pointed out in the claims annexed to and forming a part of this specification. The invention itself, however, both as to its organization and manner of operation, together with further objects and advantages thereof will be better understood from the following description taken in connection with the accompanying drawings in which:

FIG. 1 is a diagrammatic illustration of a recording oscillograph system embodying the invention;

FIG. 2 is a graph illustrating characteristics of the system of FIG. 1; and

FIG. 3 is a circuit diagram of a delay line employed in the system of FIG. 1.

Referring now to the drawing, the oscillograph control system illustrated in FIG. 1 comprises a high speed automatic recording oscillograph indicated diagrammatically within a dotted rectangle 10. The oscillograph includes a moving coil galvanometer 11, a film transport system 12 and a high speed initiating or starting mechanism 13. The film transport system includes a supply reel 14 and take-up reel 15, the film being driven at constant speed by drive rollers 16 and 17. The roller 16 positions the film in the path of a light beam from a lamp 18 which is reflected to the film from the galvanometer mirror indicated at 20.

The galvanometer coil indicated at 21 is connected for continuous excitation by a potential instrument transformer 22 which is connected across power lines 23 and energizes the coil 21 through a delay line circuit 24 embodying the invention.

The delay line circuit has been illustrated as comprising two delay line elements or modular units 25 and 26, an input to the unit 25 being shown connected by a detachable lead 27 to a terminal 28. The terminal 28 is connected to a resistance 29 which shunts the secondary of the potential transformer 22, the connection being made through a capacitor 30 which in turn is connected to the other side of the secondary through a resistance 30a and an inductance 30b in series. Two additional terminals 31 and 32 are provided so that resistances 33 and 34 may be connected in shunt to the capacitor 30 through suitable detachable bridging elements, one of which is indicated at 28a between the terminals 28 and 31. With this arrangement of the terminals 28, 31 and 32 and detachable bridging elements such as the element 28a, either of the resistors 33 and 34 may be connected alternatively in shunt to the capacitance 30 or both may be connected in parallel by connecting all three terminals together, the lead 27 being connected either to the bridging element or directly to one of the selected terminals. The connection of the resistance 34 in shunt to the capacitance 30 is effected by a bridging member sufficiently long to reach from the terminal 28 to the terminal 32 without contacting the intermediate terminal 31. The several available connections provided in this manner are selected in accordance with the particular time delay of the selected delay line.

As indicated, the delay line is constructed of identical units and one or more of these units may be used in series depending upon the total delay time required. The output of the unit 26 is connected by a detachable lead 35 to either one of three contacts 36, 37 and 38, it being indicated as connected to the contact 37. The galvanometer coil is thus connected either directly to the output of the line 26 or through a resistance 40 when connected to terminal 37 or through resistances 40 and 41 in series when connected to the terminal 38.

If it is desired to connect the galvanometer for recording of the wave form of the current flowing in the power line, a current transformer 42 is provided and three terminal 43, 44 and 45 are provided for selective connection of the delay line input across the secondary of the transformer 42, these three connections being selected in accordance with the characteristics of the delay line being employed. Bridging connectors may be employed to secure connection of the resistance in shunt to the capacitor in the same manner as the connector to the terminals 28, 31 and 32; a connector 43a has been indicated for purposes of illustration. The lead 27 thus is employed for connecting the delay line to any one of the terminals 28, 31, 32, 43, 44 and 45 depending upon the nature of the input and the delay period required.

The operation of the oscillograph 10 is initiated by energization of a coil 46 of a relay 47 which actuates the initiating mechanism 13. The coil 46 is suitably energized upon the occurrence of a fault, or other condition to be recorded, by operation of a detector device 48 suitably connected in the power lines 23.

Operation of the initiation device 13 starts the film or other photosensitive recording strip and brings the strip up to full speed immediately and also energizes the lamp 18 so that the vibrations of the galvanometer mirror 20 are accurately recorded in a very short time interval, say two milliseconds, after the fault or other condition has been detected. The vibrations first recorded are those occurring at a time prior to the fault as determined by the characteristics of the delay line 24. Thus by making the delay time greater than the time required to start the oscillograph operation, it becomes possible to secure information in regard to the conditions prevailing in the power lines before the occurrence of the transient under observation. For example, as indicated in FIG. 2, the wave form at the power line is indicated by the curve 53 and the wave form producing the galvanometer vibrations at 54 which occurs after a delay time 55 with respect to the curve 53. When a transient such as indicated at 56 occurs in the curve 53 and effects initiation of the oscillograph in a time substantially less than the delay 55, the oscillograph will record the wave form prior to the occurrence of the transient 56 and may, for example, begin to record at a point 57 which includes a portion of the wave before occurrence of the fault appearing on the oscillograph record at 56a. With this circuit it is possible to record and observe the wave conditions prevailing immediately before the transient or fault which effected initiation of the oscillograph operation.

In order to produce an effectively useful record by operation of the oscillograph 10 in the manner set forth above, it is essential that the wave form at the galvanometer be the same as that at the instrument transformer 22. Thus it is essential that the characteristics of the delay line be linear to assure transmission of the delayed wave form without distortion.

Each of the units 25 and 26 and additional delay line units if desired are of the same construction and may be connected directly in series with one another to provide the required total time delay. The circuit of these delay line units as represented by the unit 25 is shown in FIG. 3. The delay line includes a plurality of identical resistances 60, 61, 62, 63, 64 and 65, each of which is connected in parallel with a respective inductance 66, 67, 68, 69, 70 nad 71. The inductances are identical and have the same characteristics and values. Each has a center tap and the center taps are connected to a common or ground line 73 by identical capacitors 74, 75, 76, 77, 78 and 79, respectively. The first and last or terminal pairs of resistances and inductances 60, 66 and 65, 71 are connected to the ground line 73 through equal capacitors 81 and 82, respectively, the capacitance of each of which is one-half that of the capacitors 75 through 79. The remaining terminals of the resistance inductance pairs 61–67 through 64–70 (these being the intermediate pairs of resistances and inductances) are connected to the line 73 through capacitors 83, 84, 85, 86 and 87; the capacitance of each of these capacitors is the same as that of each of the capacitors 74 through 79. Thus all capacitors in the delay line except the terminal capacitors are identical and the terminal capacitors each have one-half the capacitance of the intermediate capacitances. Thus, when two lines are connected in series the two connected terminal capacitors provide a capacitance equal to that of one of the intermediate capacitors, and a continuous line is provided having the same characteristics as a single unit of the same length.

The delay line thus provided, which is a passive network comprising inductors and capacitors, is potted in an epoxy resin or other suitable plastic compound and provides a rugged and reliable unit. The characteristics of the delay line within its respective design rating provide a constant time lag from input to output at an essentially fixed signal amplitude attenuation. Thus the signal reaching the galvanometer is a true representation of the original signal except for time displacement. The linearity of the delay line is effected by employing identical resistances and inductances and capacitors as described above and particularly by utilizing the center tap of the inductances connected to ground or reference potential through matched capacitances.

A delay line constructed as described herein requires fewer resistance-inductance pairs or sections and results in a reduction of the weight of the time delay circuit to about two-thirds that of the lines employed heretofore. Furthermore, the cost of the delay line for the same delay time has been reduced materially.

For purposes of illustration and not by way of limitation, one delay line unit embodying this invention and designed to produce a delay time of approximately 8.3 milliseconds when employed with a 0 to 500 cycles per second signal comprised nineteen sections each including a resistance-inductance pair and capacitors connected as shown in FIG. 3, the various components having the following values:

Resistances (each) _____ohms__ 9100
Inductances (each) _____millihenries__ 50.5
Intermediate capacitances (each) ___microfarads__ 2
Terminal capacitances (each) _____do____ 1

Delay line units of this construction were potted in an epoxy resin and, when employed in an oscillograph circuit as indicated in FIG. 1, effectively provided galvanometer signals occurring about 8.3 milliseconds after the signal at the power line. The units were tested singly and with two and three connected in series. The two units in series produced a delay time of about 16.6 milliseconds and the three units a delay time of 25 milliseconds, the delay time of each unit being one-half cycle of a 60-cycle signal.

While the invention has been illustrated and described in connection with a specific type of recording oscillograph, various other applications and modifications will occur to those skilled in the art. Therefore it is not desired that the invention be limited to the details illustrated and described and it is intended by the appended claims to cover all modifications which fall within the spirit and scope of the invention.

I claim:
1. A time delay circuit comprising an input terminal and an output terminal, a plurality of impedance pairs connected in series between said terminals, each of said pairs comprising a resistance and an inductance connected in parallel, as base potential line, each of the connections between adjacent ones of said impedance pairs being connected to said line by a respective capacitor, all of said capacitors having the same capacitance and all of said pairs having the same impedance, two terminal capacitors each of one-half the capacity of each of said first mentioned capacitors and connected between said line and a respective one of said terminals, each of said inductances having a center tap, and each of said center taps being connected to said line by a capacitor of the same capacity as each of said first mentioned capacitors.

2. A system for recording transient wave phenomena in the output of a wave source comprising a recording oscillograph including a galvanometer and a light-sensitive recording apparatus, means including a time delay circuit for connecting said galvanometer to the wave source whereby said galvanometer is energized continuously by the source to vibrate therewith, said delay circuit comprising a plurality of equal impedance elements connected in series between input and output terminals each element consisting of a resistance and an inductance connected in parallel, a reference potential conductor, each of the connections between adjacent ones of said impedance elements being connected to said conductor through a respective capacitor, said inductances having center taps, each of said center taps being connected to said conductor through a respective capacitor, all of said capacitors having the same capacitance, two capacitors each of one-half the capacitance of said first mentioned capacitors and connected between a respective one of said terminals and said conductor, and means responsive to a predetermined transient condition of said source for starting said recording apparatus whereby said apparatus records continuously the condition of said source and those events which occurred at an interval of time prior to the starting of said apparatus.

References Cited by the Examiner

UNITED STATES PATENTS

| | | | |
|---|---|---|---|
| 2,467,670 | 4/1949 | Hershberger | 333—29 X |
| 3,068,405 | 12/1962 | Glazer et al. | 333—29 X |
| 3,166,375 | 1/1965 | Hathaway | 346—33 |
| 3,181,171 | 4/1965 | Erickson | 346—109 |

RICHARD B. WILKINSON, *Primary Examiner.*